United States Patent
Hirata et al.

(10) Patent No.: US 11,021,778 B2
(45) Date of Patent: Jun. 1, 2021

(54) AUSTENITIC STAINLESS STEEL WELD METAL AND WELDED STRUCTURE

(71) Applicant: NIPPON STEEL CORPORATION, Tokyo (JP)

(72) Inventors: Hiroyuki Hirata, Tokyo (JP); Kana Jotoku, Tokyo (JP); Katsuki Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/753,182

(22) PCT Filed: Oct. 3, 2018

(86) PCT No.: PCT/JP2018/037098
§ 371 (c)(1),
(2) Date: Apr. 2, 2020

(87) PCT Pub. No.: WO2019/070001
PCT Pub. Date: Apr. 11, 2019

(65) Prior Publication Data
US 2020/0239986 A1    Jul. 30, 2020

(30) Foreign Application Priority Data
Oct. 3, 2017    (JP) ............................. JP2017-193689

(51) Int. Cl.
*C22C 38/58*    (2006.01)
*B23K 35/30*    (2006.01)
(Continued)

(52) U.S. Cl.
CPC .......... *C22C 38/58* (2013.01); *B23K 35/3086* (2013.01); *C22C 38/001* (2013.01);
(Continued)

(58) Field of Classification Search
CPC ..... C22C 38/58; C22C 38/001; C22C 38/002; C22C 38/005; C22C 38/02; C22C 38/06;
(Continued)

(56) References Cited

U.S. PATENT DOCUMENTS

2008/0089803 A1    4/2008    Okada et al.

FOREIGN PATENT DOCUMENTS

| CN | 101151394 A | 3/2008 |
| JP | 61-238914 A | 10/1986 |

(Continued)

OTHER PUBLICATIONS

Hirata et al., JP2001107196A machine translation, Apr. 17, 2001, entire machine translation (Year: 2001).*

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

An austenitic stainless steel weld metal which has a chemical composition consisting of, by mass %, C: 0.05 to 0.11%, Si: 0.10 to 0.50%, Mn: 1.0 to 2.5%, P: 0.035% or less, S: 0.0030% or less, Co: 0.01 to 1.00%, Ni: 9.0 to 11.5%, Cr: 17.0 to 21.0%, Nb: 0.60 to 0.90%, Ta: 0.001 to 0.100%, N: 0.01 to 0.15%, Al: 0.030% or less, O: 0.020% or less, V: 0 to 0.10%, Ti: 0 to 0.10%, W: 0 to 0.50%, Mo: 0 to 0.50%, Cu: 0 to 0.50%, B: 0 to 0.005%, Ca: 0 to 0.010%, Mg: 0 to 0.010% and REM: 0 to 0.10%, with the balance being Fe and impurities, and satisfying [Nb−7.8×C≤0.25].

4 Claims, 2 Drawing Sheets

(51) Int. Cl.
*C22C 38/00* (2006.01)
*C22C 38/02* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)

(52) U.S. Cl.
CPC .......... *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01)

(58) Field of Classification Search
CPC ......... C22C 38/42; C22C 38/44; C22C 38/46; C22C 38/48; C22C 38/50; C22C 38/52; C22C 38/54; B23K 35/3086
USPC ......................................................... 420/39
See application file for complete search history.

(56) References Cited

FOREIGN PATENT DOCUMENTS

| | | | |
|---|---|---|---|
| JP | 6-142980 A | 5/1994 |
| JP | 9-300096 A | 11/1997 |
| JP | 11-151593 A | 6/1999 |
| JP | 2001-107196 A | 4/2001 |
| JP | 2001-300763 A | 10/2001 |
| JP | 2015-137419 A | 7/2015 |
| JP | 2017-95767 A | 6/2017 |

OTHER PUBLICATIONS

International Preliminary Report on Patentability and Written Opinion of the International Searching Authority with an English translation (forms PCT/IB/373, PCT/ISA/237 and PCT/IB/326), dated Apr. 16, 2020, for corresponding International Application No. PCT/JP20181037098.

International Search Report (form PCT/ISA/210), dated Dec. 11, 2018, for corresponding International Application No. PCT/JP2018/037098, with an English translation.

Naiki et al., "Cracking in Welded 18 Cr—12Ni—Nb Steel During Stress Relieving," Ishikawajima Harima Engineering Review, vol. 15, No. 2, 1975, No. 2, pp. 209-215, with an English abstract.

Ogawa et al., "Hot Cracking Susceptibility of Niobium-containing Austenitic Stainless Steel Welds," Journal of the Japan Welding Society, vol. 50, No. 7, 1981, pp. 54-62, with an English abstract.

* cited by examiner

AUSTENITIC STAINLESS STEEL WELD METAL AND WELDED STRUCTURE

TECHNICAL FIELD

The present invention relates to an austenitic stainless steel weld metal and to a welded structure having the austenitic stainless steel weld metal.

BACKGROUND ART

TP316H that is defined by ASME (American Society of Mechanical Engineers) SA213 and SA213M contains Mo and is excellent in corrosion resistance at high temperatures, and is therefore widely used as a material for heat-transfer pipes and heat exchangers in thermal power generation plants and petrochemical plants.

In the case of assembling the TP347H for a structure, the assembly is generally made by welding for use as a welded structure that has weld metal. Although weld metal obtained by using a commercially available welding material for Ni-based heat resistant alloys (for example, JIS Z 3334 (2011) SNi6082) provides consistently adequate performance from the viewpoint of creep strength and toughness, the weld metal is expensive because it contains a large amount of Ni. On the other hand, a weld metal obtained by using a commercially available welding material for Mo-containing stainless steel (JIS Z 3321 (2010) YS16-8-2) is inexpensive and offers excellent economic efficiency.

However, as disclosed in Non-Patent Document 1, it is widely known that in the case of using austenitic stainless steel weld metal that contains Nb, the solidification cracking susceptibility is high during welding thereof. In addition, as disclosed in Non-Patent Document 2, when used at a high temperature for a welded structure, embrittlement cracking which is referred to as "stress relaxation cracking", "strain-induced precipitation hardening cracking", or the like is liable to occur in a weld zone during the use thereof. In addition, Patent Documents 1 to 3 disclose welding materials that contain Nb.

LIST OF PRIOR ART DOCUMENTS

Patent Documents

Patent Document 1: JP6-142980A
Patent Document 2: JP9-300096A
Patent Document 3: JP2001-300763A

Non-Patent Documents

Non-Patent Document 1: Ogawa et al., Journal of the Japan Welding Society, Vol. 50, No. 7 (1981), p. 680 (in Japanese)
Non-Patent Document 2: Naiki et al., Ishikawajima Harima Engineering Review, Vol. 15 (1975), No. 2, p. 209 (in Japanese)

SUMMARY OF INVENTION

Technical Problem

However, although the welding materials described in Patent Documents 1 to 3 and the like increase the high temperature strength of the obtained weld metal because they each contain Mo, W, Cu, or the like, these welding materials are inferior in terms of economic efficiency because they contain a large amount of the aforementioned elements. Further, although each of the aforementioned welding materials has increased solidification cracking resistance during welding achieved by reducing impurities such as P and S, the problem of cracking during use is not mentioned in the aforementioned Patent Documents 1 to 3.

Therefore, there is a need to suppress the occurrence of weld cracks and realize excellent weld crack resistance. On the other hand, even in a case where weld cracks are suppressed, in some cases the creep strength deteriorates when the welded structure is exposed to a high temperature environment (for example, an environment at 650° C.), and therefore there is a need to realize stable creep strength in a high temperature environment in addition to weld crack resistance.

An objective of the present invention is to provide an austenitic stainless steel weld metal which is excellent in weld crack resistance and has high creep strength and which is weld metal that constitutes a structure used in equipment to be used at high temperatures, and also provide a welded structure that includes the austenitic stainless steel weld metal.

Solution to Problem

The present invention has been made to solve the problems described above, and the gist of the present invention is the following austenitic stainless steel weld metal and the welded structure.

(1) An austenitic stainless steel weld metal having a chemical composition consisting of, by mass %:
C: 0.05 to 0.11%,
Si: 0.10 to 0.50%,
Mn: 1.0 to 2.5%,
P: 0.035% or less,
S: 0.0030% or less,
Co: 0.01 to 1.00%,
Ni: 9.0 to 11.5%,
Cr: 17.0 to 21.0%,
Nb: 0.60 to 0.90%,
Ta: 0.001 to 0.100%,
N: 0.01 to 0.15%,
Al: 0.030% or less,
O: 0.020% or less,
V: 0 to 0.10%,
Ti: 0 to 0.10%,
W: 0 to 0.50%,
Mo: 0 to 0.50%,
Cu: 0 to 0.50%,
B: 0 to 0.005%,
Ca: 0 to 0.010%,
Mg: 0 to 0.010%,
REM: 0 to 0.10%, and
the balance: Fe and impurities,
and satisfying formula (i) below:

$$\mathrm{Nb} - 7.8 \times \mathrm{C} \leq 0.25 \qquad (\mathrm{i})$$

where, each symbol of an element in the above formulas represents a content (mass %) of the corresponding element contained in the steel.

(2) The austenitic stainless steel weld metal according to (1) above, wherein:
the chemical composition contains, by mass %:
V: 0.01 to 0.10%,
Ti: 0.01 to 0.10%,
W: 0.01 to 0.50%,
Mo: 0.01 to 0.50%, Cu: 0.01 to 0.50%,
B: 0.0002 to 0.005%,
Ca: 0.0005 to 0.010%,
Mg: 0.0005 to 0.010%, and
REM: 0.0005 to 0.10%.

(3) A welded structure having the austenitic stainless steel weld metal according to (1) or (2) above.

Advantageous Effects of Invention

According to the present invention, an austenitic stainless steel weld metal which is excellent in weld crack resistance and has high creep strength and which is weld metal that constitutes a structure used in equipment to be used at high temperatures, and also a welded structure that includes the austenitic stainless steel weld metal can be obtained.

DESCRIPTION OF EMBODIMENTS

Figure 1:
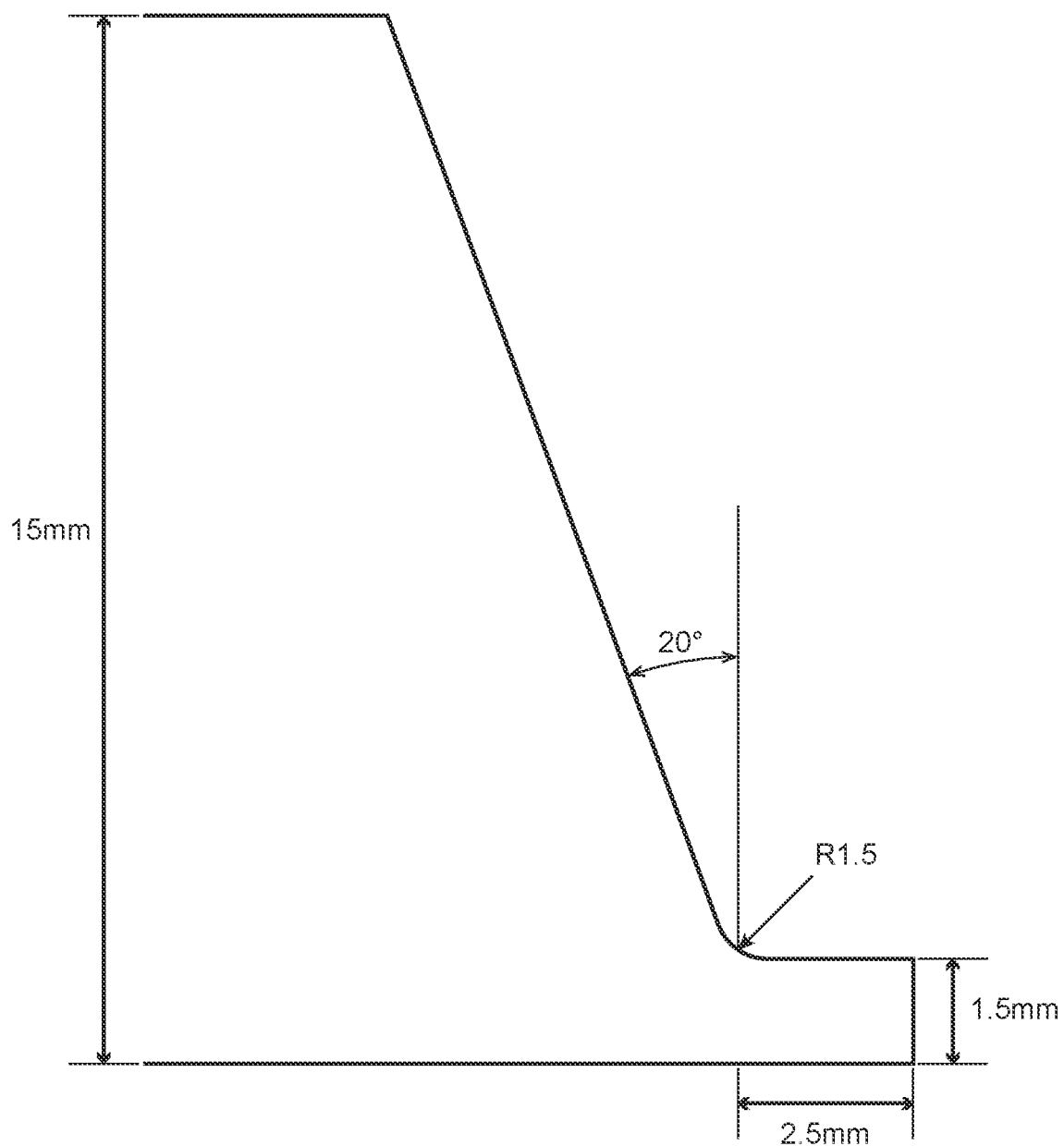
FIG. 1 is a schematic cross-sectional view illustrating the shape of a plate which was subjected to beveling in the Examples.

The present inventors conducted detailed studies for achieving both excellent weld crack resistance and stable creep strength as a structure. As a result, the present inventors obtained the following findings.

As the result of studies conducted regarding a cracking phenomenon that occurs in as-welded austenitic stainless steel weld metal containing Nb, the present inventors discovered the following two facts.

(a) Cracking in as-welded weld metal occurred at intersection of columnar crystals, and the fracture surface exhibited smooth properties which suggested that a liquid phase had remained. In addition, a noticeable concentration of Nb was observed at a portion at which it was estimated that the liquid phase had remained. On the other hand, in weld metal in which cracking did not occur, lamella-like NbC was observed at intersection of columnar crystals.

(b) Cracking in weld metal after use at a high temperature occurred at columnar crystal boundaries of the weld metal, and the fracture surface exhibited poor ductility properties, and concentration of S was detected. In addition, fine Nb carbides or Nb carbo-nitrides had precipitated in large amounts within columnar crystals.

Therefore, it is considered that the former is so-called "solidification cracking" and is cracking which occurs when the melting point of a residual liquid phase decreases due to Nb undergoing solidification segregation during the solidification of weld metal, and as a result a liquid film is present for an extended period at intersection of columnar crystals, and such portions open due to thermal stress. With respect to weld metal in which cracking did not occur, it was inferred from the morphology of NbC that eutectic solidification between NbC and the matrix occurred and the liquid phase disappeared in a short time, and hence solidification cracking did not occur.

Further, the latter is stress relaxation cracking, and is considered to be cracking that occurred when it became difficult for the inside of grains to deform due to Nb carbides, Nb nitrides or Nb carbo-nitrides precipitating in large amounts during use at a high temperature, and creep deformation that occurred in the course of weld residual stress being released was concentrated at columnar crystal boundaries and such portions opened. Further, it is considered that S segregates at columnar crystals during welding or during use at a high temperature and reduces the bonding strength thereof, and consequently cracking is liable to occur if the content of S is large.

Further, as the result of intensive studies, the present inventors ascertained that, in an austenitic stainless steel weld metal having a composition that is the object of the present invention, in order to prevent cracking and also to obtain a high creep strength, it is necessary that the content of Nb is within the range of 0.60 to 0.90% and the value of Nb−7.8×C is not more than 0.25, and also the content of S is limited to not more than 0.0030%. In addition, the present inventors found that it is necessary to contain a prescribed amount or more of Co in order to sufficiently obtain an effect that reduces weld crack susceptibility.

The present invention was made based on the findings described above. The respective requirements of the present invention are described in detail hereunder.

(A) Chemical Composition

The reasons for limiting each element are as follows. Note that, the symbol "%" with respect to content in the following description means "mass percent".

C: 0.05 to 0.11%

C makes the austenite phase stable and also combines with Nb to form fine carbides, and improves the creep strength during use at high temperatures. Further, C combines with Nb in the course of final solidification during welding and causes eutectic solidification to occur between NbC and the matrix, causing the liquid phase to disappear at an early stage and thereby prevents solidification cracking. However, if C is contained in excess, a large amount of carbides will precipitate at an early stage during use at a high temperature, and will promote stress relaxation cracking. Therefore, the content of C is set within the range of 0.05 to 0.11%. The content of C is preferably 0.06% or more, and is preferably 0.10% or less.

Si: 0.10 to 0.50%

Si is an element that has a deoxidizing action, and is also required to secure corrosion resistance and oxidation resistance at high temperatures. However, if an excessive amount of Si is contained, the stability of the austenite phase will decrease, which will result in a decrease in the creep strength. Therefore, the content of Si is set within the range of 0.10 to 0.50%. The content of Si is preferably 0.15% or more, and more preferably is 0.20% or more. Further, the content of Si is preferably not more than 0.45%, and more preferably is not more than 0.40%.

Mn: 1.0 to 2.5%

Similarly to Si, Mn is an element that has a deoxidizing action. Mn also makes the austenite phase stable and contributes to improvement of the creep strength. However, if an excessive amount of Mn is contained, it will result in a decrease in creep ductility. Therefore, the content of Mn is set within the range of 1.0 to 2.5%. The content of Mn is preferably 1.1% or more, and more preferably is 1.2% or more. Further, the content of Mn is preferably not more than 2.2%, and more preferably is not more than 2.0%.

P: 0.035% or less

P is an element which is contained as an impurity, and segregates during solidification during welding and lowers the melting point of the residual liquid phase and increases the solidification cracking susceptibility. P also decreases the creep ductility. Therefore, an upper limit is set for the content of P, and is 0.035% or less. The content of P is preferably 0.032% or less, and more preferably is 0.030% or less. Note that, although it is preferable that the content of P is reduced as much as possible, that is, although the content may be 0%, extreme reduction of the content of P will lead to an increase in costs at the time of material production. Therefore, the content of P is preferably 0.0005% or more, and more preferably is 0.0008% or more.

S: 0.0030% or less

Similarly to P, S is contained as an impurity, and segregates during solidification during welding and lowers the melting point of the residual liquid phase and increases the solidification cracking susceptibility. Further, by undergoing grain-boundary segregation in a thermal cycle of a subsequent weld pass after solidification, S also increases the ductility-dip cracking susceptibility. Therefore, an upper limit is set for the content of S, and is 0.0030% or less. The content of S is preferably less than 0.0025%, and more preferably is not more than 0.0020%. Note that although it is preferable that the content of S is reduced as much as possible, that is, although the content may be 0%, extreme reduction of the content of S will lead to an increase in costs at the time of material production. Therefore, the content of S is preferably 0.0001% or more, and more preferably is 0.0002% or more.

Co: 0.01 to 1.00%

Co is an element that enhances the stability of the austenite phase and contributes to improving the creep strength. Further, the influence of imparting segregation energy of P and S and the like is small in comparison to Ni and Mn, and thus an effect of reducing segregation during solidification and decreasing weld crack susceptibility can be expected. However, because Co is an expensive element, if an excessive amount of Co is contained, it will result in an increase in the production cost of the material. Therefore, the content of Co is set within the range of 0.01 to 1.00%. The content of Co is preferably 0.015% or more, and more preferably is 0.02% or more. Further, the content of Co is preferably not more than 0.90%, and more preferably is not more than 0.80%.

Ni: 9.0 to 11.5%

Ni is an essential element for ensuring the stability of the austenite phase during use for an extended period. However, Ni is an expensive element, and containing a large amount of Ni leads to an increase in the production cost of the material. Therefore, the content of Ni is set within the range of 9.0 to 11.5%. The content of Ni is preferably 9.2% or more, and more preferably is 9.5% or more. Further, the content of Ni is preferably not more than 11.2%, and more preferably is not more than 11.0%.

Cr: 17.0 to 21.0%

Cr is an essential element for ensuring oxidation resistance and corrosion resistance at a high temperature. Further, Cr also forms fine carbides and contributes to ensuring creep strength. However, containing a large amount of Cr will reduce the stability of the austenite phase, and on the contrary, will be detrimental to the creep strength. Therefore, the content of Cr is set within the range of 17.0 to 21.0%. The content of Cr is preferably 17.2% or more, and more preferably is 17.5% or more. Further, the content of Cr is preferably not more than 20.8%, and more preferably is not more than 20.5%.

Nb: 0.60 to 0.90%

Nb is an element that combines with C and/or N and precipitates within grains as fine carbides, nitrides or carbo-nitrides and contributes to enhancing the creep strength and tensile strength at high temperatures. However, if contained in excess, a large amount of carbo-nitrides will precipitate and result in an increase in stress relaxation cracking susceptibility. Further, Nb solidifies during the course of solidification of the weld metal, lowers the melting point of the liquid phase, and increases solidification cracking susceptibility. Therefore, the content of Nb is set within the range of 0.60 to 0.90%. The content of Nb is preferably 0.65% or more, and is preferably 0.85% or less.

Ta: 0.001 to 0.100%

Ta is an element that, similarly to Nb, combines with C and/or N and precipitates within grains as fine carbides, nitrides or carbo-nitrides and contributes to enhancing the creep strength and tensile strength at a high temperature. In addition, Ta has an action that delays the start of precipitation and reduces stress relaxation cracking by replacing Ta for Nb and dissolving in nitrides or carbo-nitrides. However, if contained in excess, Ta results in an increase in stress relaxation cracking susceptibility. Therefore, the content of Ta is set within the range of 0.001 to 0.100%. The content of Ta is preferably 0.002% or more, and in particular, when it is desired to adequately obtain an effect of delaying the start of precipitation and reducing stress relaxation cracking susceptibility, the content of Ta is more preferably 0.005% or more. Further, the content of Ta is preferably not more than 0.090%, and more preferably is not more than 0.080%.

N: 0.01 to 0.15%

N makes the austenite phase stable, and also dissolves or precipitates as nitrides and contributes to improving high temperature strength. However, if contained in excess, N forms a large amount of precipitates, and leads to a decrease in ductility. Therefore, the content of N is set within the range of 0.01 to 0.15%. The content of N is preferably 0.02% or more, and more preferably is 0.03% or more. Further, the content of N is preferably not more than 0.14%, and more preferably is not more than 0.12%.

Al: 0.030% or less

If a large amount of Al is contained, the cleanliness will deteriorate and the ductility will decrease. Therefore, the content of Al is set to 0.030% or less. The content of Al is preferably 0.025% or less, and more preferably is 0.020% or less. Note that, although it is not particularly necessary to set a lower limit for the content of Al, that is, although the content may be 0%, an extreme reduction will lead to an increase in the production cost of the material. Therefore, the content of Al is preferably 0.0005% or more, and more preferably is 0.001% or more.

O: 0.020% or less

O (oxygen) is contained as an impurity. If the content of O is excessive, it will result in a deterioration in toughness and ductility. Therefore, the content of O is 0.020% or less. The content of O is preferably 0.018% or less, and more preferably is 0.015% or less. Note that, although it is not particularly necessary to set a lower limit for the content of O, that is, although the content may be 0%, an extreme reduction will lead to an increase in the production cost of the material. Therefore, the content of O is preferably 0.0005% or more, and more preferably is 0.0008% or more.

As described above, Nb segregates during solidification during welding and thereby causes the melting point of the liquid phase to decrease and increases the solidification cracking susceptibility. To prevent this, it is effective to cause eutectic solidification between NbC and the matrix to occur during the course of solidification and thereby cause the liquid phase to disappear at an early stage. In order to utilize this effect to prevent solidification cracking, it is necessary not only for the content of Nb to be within the aforementioned range, but also to satisfy formula (i) below. The right-hand value in formula (i) is preferably 0.23, and more preferably is 0.20. Note that, although it is not necessary to set a lower limit for the left-hand value in formula (i), based on the ranges of the contents of the respective elements, it is self-evident that the value will be −0.258 or more.

$$Nb - 7.8 \times C \leq 0.25 \qquad (i)$$

where, each symbol of an element in the above formula represents a content of (mass %) of the corresponding element that is contained in the steel.

In the chemical composition of the weld metal of the present invention, in addition to the elements described above, one or more types of element selected from V, Ti, W, Mo, Cu, B, Ca, Mg and REM may also be contained within the ranges described below. The reasons for limiting each element are described hereunder.

V: 0 to 0.10%

V combines with C and/or N to form fine carbides, nitrides or carbo-nitrides and contributes to the creep strength, and therefore may be contained as necessary. However, if contained in excess, carbo-nitrides will precipitate in a large amount, and will result in a deterioration in stress relaxation cracking resistance. Therefore, the content of V is set to 0.10% or less. The content of V is preferably 0.09% or less, and more preferably is 0.08% or less. Note that, when it is desired to obtain the aforementioned effect, the content of V is preferably 0.01% or more, and more preferably is 0.02% or more.

Ti: 0 to 0.10%

Ti is an element that, similarly to V, combines with C and/or N to form fine carbides, nitrides or carbo-nitrides and contributes to creep strength, and therefore may be contained as necessary. However, if contained in excess, a large amount of carbo-nitrides will precipitate and result in a deterioration in stress relaxation cracking resistance. Therefore, the content of Ti is set to 0.10% or less. The content of Ti is preferably 0.08% or less, and more preferably is 0.06% or less. Note that, when it is desired to obtain the aforementioned effect, the content of Ti is preferably 0.01% or more, and more preferably 0.02% or more.

W: 0 to 0.50%

W is an element that dissolves in the matrix and contributes to enhancement of creep strength and tensile strength at high temperatures, and therefore may be contained as necessary. However, if contained in excess, W will reduce the stability of the austenite phase and, on the contrary, will result in a decrease in the creep strength. Therefore, the content of W is set to 0.50% or less. The content of W is preferably 0.40% or less, and more preferably 0.30% or less. Note that, when it is desired to obtain the aforementioned effect, the content of W is preferably 0.01% or more, and more preferably 0.02% or more.

Mo: 0 to 0.50%

Mo is an element that, similarly to W, dissolves in the matrix and contributes to enhancement of creep strength and tensile strength at high temperatures, and therefore may be contained as necessary. However, if contained in excess, Mo will reduce the stability of the austenite phase and will be detrimental to the creep strength. In addition, because Mo is an expensive element, if the content of Mo is excessive, it will result in an increase in the production cost of the material. Therefore, the content of Mo is 0.50% or less. The content of Mo is preferably 0.40% or less, and more preferably is 0.30% or less. Note that, when it is desired to obtain the aforementioned effect, the content of Mo is preferably 0.01% or more, and more preferably is 0.02% or more.

Cu: 0 to 0.50%

Cu is an element that enhances the stability of the austenite phase and contributes to improving the creep strength, and therefore may be contained as necessary. However, if contained in excess, it will result in a decrease in ductility. Therefore, the content of Cu is 0.50% or less. The content of Cu is preferably 0.40% or less, and more preferably is 0.30% or less. Note that, when it is desired to obtain the aforementioned effect, the content of Cu is preferably 0.01% or more, and more preferably is 0.02% or more.

B: 0 to 0.005%

B causes grain boundary carbides to finely disperse to thereby enhance the creep strength, and also segregates at the grain boundaries to strengthen the grain boundaries and has a certain effect for reducing ductility-dip cracking susceptibility, and therefore may be contained as necessary. However, if contained in excess, conversely, B will increase solidification cracking susceptibility. Therefore, the content of B is set to 0.005% or less. The content of B is preferably 0.004% or less, and more preferably is 0.003% or less. Note that, when it is desired to obtain the aforementioned effect, the content of B is preferably 0.0002% or more, and more preferably 0.0005% or more.

Ca: 0 to 0.010%

Ca has an effect that improves hot deformability, and therefore may be contained as necessary. However, if contained in excess, Ca will combine with oxygen and cause the cleanliness to markedly decrease, and on the contrary will cause the deformability during hot processing to deteriorate. Therefore, the content of Ca is set to 0.010% or less. The content of Ca is preferably 0.008% or less, and more preferably is 0.005% or less. Note that, when it is desired to obtain the aforementioned effect, the content of Ca is preferably 0.0005% or more, and more preferably is 0.001% or more.

Mg: 0 to 0.010%

Mg is an element that, similarly to Ca, has an effect that improves hot deformability, and therefore may be contained as necessary. However, if contained in excess, Mg will combine with oxygen and cause the cleanliness to markedly decrease, and on the contrary will cause the deformability during hot processing to deteriorate. Therefore, the content of Mg is set to 0.010% or less. The content of Mg is preferably 0.008% or less, and more preferably 0.005% or less. Note that, when it is desired to obtain the aforementioned effect, the content of Mg is preferably 0.0005% or more, and more preferably 0.001% or more.

REM: 0 to 0.10%

Similarly to Ca and Mg, REM has an effect that improves hot deformability, and therefore may be contained as necessary. However, if contained in excess, REM will combine with oxygen and cause the cleanliness to markedly decrease, and on the contrary will cause the deformability during hot processing to deteriorate. Therefore, the content of REM is set to 0.10% or less. The content of REM is preferably 0.08% or less, and more preferably 0.06% or less. Note that, when it is desired to obtain the aforementioned effect, the content of REM is preferably 0.0005% or more, and more preferably 0.001% or more.

As used herein, the term "REM" refers to a total of 17 elements that are Sc, Y and the lanthanoids, and the aforementioned content of REM means the total content of these elements.

In the chemical composition of the weld metal of the present invention, the balance is Fe and impurities. As used herein, the term "impurities" refers to components which, during industrial production of the steel, are mixed in from raw material such as ore or scrap or due to various factors in the production process, and which are allowed within a range that does not adversely affect the present invention.

(B) Production Method

The austenitic stainless steel weld metal according to the present invention is produced by welding a base metal of austenitic stainless steel. Note that, the austenitic stainless steel weld metal may also be produced by using a welding material (filler material) when welding the base metal.

A welding method for obtaining the austenitic stainless steel weld metal according to the present invention includes, but not particularly limited to, TIG welding, MIG welding, shielded metal arc welding, submerged arc welding and laser welding.

Examples of methods for producing an austenitic stainless steel weld metal so as to satisfy the chemical composition described above include a method that controls by adjusting the chemical composition of the base metal of austenitic stainless steel that is used, and a method that, in a case where a welding material (filler material) is also used, controls by also adjusting the chemical composition of the welding material in addition to the chemical composition of the base metal of austenitic stainless steel.

For example, the weld metal to be obtained may be produced so as to satisfy the aforementioned chemical composition by using only material which satisfies the aforementioned chemical composition as the base metal of austenitic stainless steel and the welding material (filler material) that are used. Further, the weld metal to be obtained may be produced so as to satisfy the aforementioned chemical composition by adjusting the balance between the compositions of the base metal of austenitic stainless steel and the welding material (filler material) while using a material that does not satisfy the aforementioned chemical composition for at least one of the base metal of austenitic stainless steel and the welding material (filler material).

Note that a preferable composition of the austenitic stainless steel base metal is not particularly limited. For example, the chemical composition of the base metal preferably consists of, by mass %, C: 0.04 to 0.12%, Si: 0.20 to 0.50%, Mn: 1.0 to 2.0%, P: 0.045% or less, S: 0.0020% or less, Co: 0.02 to 0.80%, Ni: 9.0 to 12.0%, Cr: 16.5 to 18.5%, Nb: 0.50 to 0.90%, Ta: 0.001 to 0.100%, N: 0.01 to 0.13%, Al: 0.030% or less, O: 0.020% or less, V: 0 to 0.10%, Ti: 0 to 0.10%, W: 0 to 0.60%, Mo: 0 to 0.60%, Cu: 0 to 0.60%, B: 0 to 0.005%, Ca: 0 to 0.010%, Mg: 0 to 0.010%, and REM: 0 to 0.10%, with the balance being Fe and impurities.

The chemical composition of the base metal may contain one or more types of element selected from, by mass %, V: 0.01 to 0.10%, Ti: 0.01 to 0.10%, W: 0.01 to 0.60%, Mo: 0.01 to 0.60%, Cu: 0.01 to 0.60%, B: 0.0002 to 0.005%, Ca: 0.0005 to 0.010%, Mg: 0.0005 to 0.010% and REM: 0.0005 to 0.10%.

Further, although a method for producing the aforementioned base metal of austenitic stainless steel and welding material (filler material) is not particularly limited, the base metal of austenitic stainless steel and the welding material (filler material) can be produced by subjecting a steel with an adjusted chemical composition to hot forging, hot rolling, heat treatment and machining in that order according to a normal method.

(C) Welded Structure

The welded structure according to the present invention is a structure that has the austenitic stainless steel weld metal mentioned above. For example, the welded structure is composed of weld metal and base metal. The base metal is made of metal, and preferably is a steel material, more preferably is stainless steel, and further preferably is austenitic stainless steel. Note that the specific shape of the welded structure and a specific manner of welding (welding position) for obtaining the welded structure are not particularly limited.

Hereunder, the present invention is described specifically by way of examples, although the present invention is not limited to these examples.

Example 1

Plates (base metals) having a thickness of 15 mm, a width of 50 mm, and a length of 100 mm and plates having a thickness of 4 mm, a width of 200 mm, and a length of 500 mm were prepared from ingots that were cast by melting steels having the chemical compositions shown in Table 1, by performing hot forging, hot rolling, heat treatment and machining. In addition, the plates having a thickness of 4 mm were used to prepare 2-mm square cut fillers having a length of 500 mm by machining. Various performance evaluation tests that are described below were conducted using these plates.

TABLE 1

| Steel | Chemical Composition (mass %: balance: Fe and impurities) | | | | | | | | |
|---|---|---|---|---|---|---|---|---|---|
| | C | Si | Mn | P | S | Co | Ni | Cr | Nb |
| A | 0.08 | 0.31 | 1.58 | 0.020 | 0.0024 | 0.02 | 10.5 | 17.5 | 0.85 |
| B | 0.07 | 0.40 | 1.98 | 0.025 | 0.0009 | 0.01 | 11.2 | 18.4 | 0.75 |
| C | 0.11 | 0.15 | 1.20 | 0.030 | 0.0029 | 0.78 | 9.5 | 20.5 | 0.90 |
| D | 0.06 | 0.21 | 1.47 | 0.032 | 0.0011 | 0.95 | 9.8 | 17.2 | 0.65 |
| E | 0.09 | 0.45 | 2.16 | 0.023 | 0.0015 | 0.54 | 9.2 | 19.2 | 0.70 |
| F | 0.10 | 0.49 | 1.14 | 0.034 | 0.0023 | 0.25 | 10.9 | 20.7 | 0.83 |
| G | 0.07 | 0.12 | 1.45 | 0.024 | <u>0.0035</u> | 0.18 | 10.7 | 19.6 | 0.76 |
| H | 0.06 | 0.35 | 1.95 | 0.034 | 0.0024 | 0.01 | 11.3 | 18.4 | 0.74 |
| I | 0.07 | 0.38 | 1.44 | 0.034 | 0.0025 | 0.03 | 11.1 | 17.3 | <u>0.57</u> |
| J | 0.10 | 0.28 | 1.36 | 0.002 | 0.0028 | 0.26 | 10.7 | 18.6 | <u>0.94</u> |

| Steel | Chemical Composition (mass %: balance: Fe and impurities) | | | | | Formula (i)† left-hand value |
|---|---|---|---|---|---|---|
| | Ta | N | Al | O | Other | |
| A | 0.005 | 0.10 | 0.011 | 0.006 | — | 0.23 |
| B | 0.001 | 0.07 | 0.009 | 0.007 | — | 0.20 |

TABLE 1-continued

| | | | | | | |
|---|---|---|---|---|---|---|
| C | 0.025 | 0.02 | 0.007 | 0.006 | — | 0.042 |
| D | 0.094 | 0.12 | 0.012 | 0.005 | W: 0.27, Cu: 0.05, Ca: 0.002 | 0.18 |
| E | 0.042 | 0.06 | 0.008 | 0.010 | Mo: 0.12, B: 0.0030, REM: 0.05 | −0.002 |
| F | 0.005 | 0.03 | 0.010 | 0.009 | Ti: 0.05, V: 0.08, Mg: 0.001 | 0.050 |
| G | 0.084 | 0.07 | 0.010 | 0.008 | — | 0.21 |
| H | 0.093 | 0.02 | 0.008 | 0.007 | — | 0.27 |
| I | 0.005 | 0.03 | 0.007 | 0.005 | Ca: 0.002 | 0.024 |
| J | 0.088 | 0.13 | 0.010 | 0.007 | B: 0.0042 | 0.16 |

†Nb−7.8 × C ≤ 0.25 . . . (i)

<Weld Crack Resistance>

A bevel having the shape shown in FIG. 1 was prepared at an end part in the longitudinal direction of the aforementioned base metal. Thereafter, two of the base metals with the bevel were butted together, and the periphery of the base metals was subjected to restraint-welding onto a commercially available steel plate which had been subjected to beveling performed so as not to interfere with the root bead. Note that, the commercially available steel plate was a steel plate defined in JIS G 3160 (2008) of SM400B steel grade which had a thickness of 30 mm, a width of 150 mm and a length of 200 mm. Further, the restraint-welding was performed using a covered electrode ENi6625 defined in JIS Z 3224 (2010).

Thereafter, multi-pass welding was performed by TIG welding in the bevel. A cut filler obtained from the same plate as each base metal was used as the filler material to perform the multi-pass welding. The heat input was set in the range of 9 to 15 kJ/cm, and three welded joints were prepared for each of the base metals. One of the two welded joints produced from each base metal was left in an as-welded state, and the other of the two welded joints was subjected to an aging heat treatment under conditions of 500 hours at a temperature of 650° C. Specimens for microstructural investigation were taken from five locations on each of these welded joints. A transverse section of each of the obtained specimens was mirror-polished and then etched before being observed by optical microscopy to determine whether cracks were present in the weld metal. A welded joint for which no cracks were observed in all of the five specimens was determined as "pass", and a welded joint in which cracks were observed was determined as "fail". Note that, since the base metal and the cut filler have the same composition, the chemical composition in Table 1 is the same chemical composition as that of the weld metal.

<Creep Rupture Strength>

In addition, a round-bar creep rupture test specimen was taken from the remaining one welded joint of the welded joints evaluated as "pass" in the weld crack resistance in a manner so that the weld metal was at the center of the parallel portion, and a creep rupture test was performed under conditions of 650° C. and 216 MPa in which the target rupture time of the base metal was approximately 1,000 hours. A welded joint for which the rupture time was 90% or more of the target rupture time of the base metal was determined as "pass".

A summary of the results of these tests is shown in Table 2.

TABLE 2

| Test No. | Steel | Cracking Resistance during Welding | Cracking Resistance during High Temperature Use | Creep Rupture Strength |
|---|---|---|---|---|
| 1 | A | Pass | Pass | Pass |
| 2 | B | Pass | Pass | Pass |
| 3 | C | Pass | Pass | Pass |
| 4 | D | Pass | Pass | Pass |
| 5 | E | Pass | Pass | Pass |
| 6 | F | Pass | Pass | Pass |
| 7 | G | Pass | Fail | Not performed |
| 8 | H | Fail | Fail | Not performed |
| 9 | I | Pass | Pass | Fail |
| 10 | J | Pass | Fail | Not performed |

As will be understood from Table 2, the results showed that in Test Nos. 1 to 6 in which steels A to F that satisfied the requirements defined by the present invention were used for both the base metal and filler material, sufficient solidification cracking resistance and stress relaxation cracking resistance were exhibited during welding and during aging at a high temperature, and the test specimens were also excellent in creep strength.

In contrast, with respect to steel G as a Comparative Example, because the content of S was outside the range defined by the present invention, in Test No. 7 which used steel G, cracking that was considered to be stress relaxation cracking occurred within the weld metal as the result of aging at a high temperature. Further, because steel H exceeded the upper limit of formula (i), in Test No. 8 which used steel H, solidification cracking occurred as the result of the melting point of the liquid phase being lowered by free Nb during solidification of the weld metal. Further, cracking that was thought to be solidification cracking that occurred during welding was also observed during cross-sectional observation after high-temperature aging.

Because the content of Nb in steel I was lower than the lower limit value, in Test No. 9 which used steel I, although cracking did not occur during welding and during aging at a high temperature, the required creep strength was not obtained. Further, because the content of Nb in steel J was more than the upper limit value, a large amount of precipitates were formed, and cracking that was thought to be stress relaxation cracking occurred within the weld metal as a result of aging at a high temperature.

Example 2

Plates (base metals) having a thickness of 25 mm, a width of 50 mm, and a length of 100 mm were prepared from the remaining material of the ingots of steels A to F used in Example 1, by performing hot forging, hot rolling, heat treatment and machining. Various performance evaluation tests that are described below were conducted using these plates.

<Weld Crack Resistance>

Figure 2:
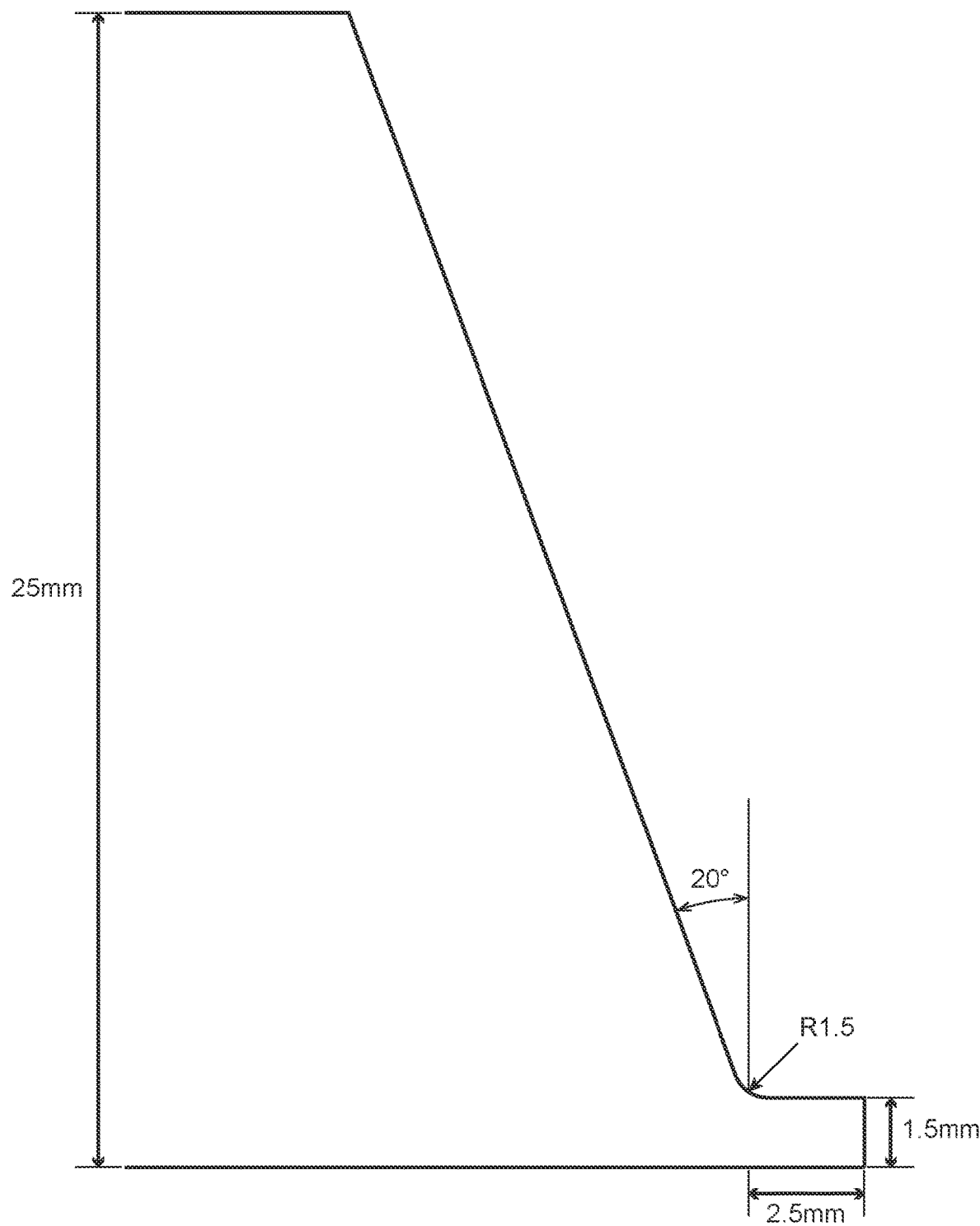
FIG. 2 is a schematic cross-sectional view illustrating the shape of a plate which was subjected to beveling in the Examples.

A bevel having the shape shown in FIG. 2 was prepared at an end part in the longitudinal direction of the aforementioned base metals. Thereafter, two of the base metals with the bevel were butted together, and the periphery of the base metals was subjected to restraint-welding onto a commercially available steel plate which had been subjected to beveling performed so as not to interfere with the root bead. Note that, the commercially available steel plate was a steel plate defined in JIS G 3160 (2008) of SM400B steel grade which had a thickness of 40 mm, a width of 150 mm and a length of 200 mm. Further, the restraint-welding was performed using a covered electrode ENi6625 defined in JIS Z 3224 (2010).

Thereafter, multi-pass welding was performed by TIG welding in the bevel. A cut filler obtained from the same plate as the respective base metals was used as the filler material to perform the multi-pass welding. The heat input was set in the range of 9 to 18 kJ/cm, and two welded joints were produced for each of the base metals. Further, one of the two welded joints produced from each base metal was left in an as-welded state, and the other of the two welded joints was subjected to an aging heat treatment under conditions of 500 hours at a temperature of 650° C. Specimens for microstructural investigation were taken from five locations on each of these welded joints. A transverse section of each of the obtained specimens was mirror-polished and then etched before being observed by optical microscopy to determine whether cracks were present in the weld metal. Welded joints with respect to which no cracks were found in any of the five specimens were determined to be "good", welded joints with respect to which cracks were found in only one of the specimens were determined to be "acceptable" and thus determined as "pass", and welded joints with respect to which cracks were found in two or more specimens were determined as "fail".

A summary of the results of these tests is shown in Table 3.

TABLE 3

| Test No. | Steel | Cracking Resistance during Welding | Cracking Resistance during High Temperature Use |
|---|---|---|---|
| 11 | A | Pass | Pass (Good) |
| 12 | B | Pass | Pass (Acceptable) |
| 13 | C | Pass | Pass (Good) |
| 14 | D | Pass | Pass (Good) |
| 15 | E | Pass | Pass (Good) |
| 16 | F | Pass | Pass (Good) |

As will be understood from Table 3, the results showed that in Test Nos. 11 to 16 in which steels A to F that satisfied the requirements defined by the present invention were used for both the base metal and filler material, even under a severe constraining condition in which the plate thickness was made thick, sufficient solidification cracking resistance and stress relaxation cracking resistance were exhibited during welding and during aging at a high temperature. However, in Test No. 12, although the welded joints were determined to have passed the test, since the content of Ta was a low amount of 0.001%, very minor stress relaxation cracking occurred in one cross-section.

Example 3

Plates (base metals) having a thickness of 15 mm, a width of 50 mm, and a length of 100 mm were prepared from ingots that were cast by melting steels having the chemical compositions shown in Table 4, by performing hot forging, hot rolling, heat treatment and machining. Various performance evaluation tests that are described below were conducted using these plates.

TABLE 4

| | Chemical Composition (mass %: balance: Fe and impurities) | | | | | | | | | | | | | |
|---|---|---|---|---|---|---|---|---|---|---|---|---|---|---|
| Steel | C | Si | Mn | P | S | Co | Ni | Cr | Nb | Ta | N | Al | O | Other |
| K | 0.08 | 0.35 | 1.55 | 0.028 | 0.0015 | 0.12 | 11.9 | 18.0 | 0.72 | 0.006 | 0.06 | 0.008 | 0.008 | — |
| L | 0.09 | 0.33 | 1.46 | 0.038 | 0.0005 | 0.08 | 10.8 | 16.8 | 0.75 | 0.010 | 0.05 | 0.008 | 0.007 | Cu: 0.34, Mo: 0.30 |
| M | 0.04 | 0.32 | 1.50 | 0.030 | 0.0011 | 0.15 | 11.2 | 17.5 | 0.57 | 0.005 | 0.05 | 0.010 | 0.006 | Ti: 0.09, REM: 0.03 |

<Weld Crack Resistance>

A bevel having the shape shown in FIG. 1 was prepared at an end part in the longitudinal direction of the aforementioned base metals. Thereafter, two of the base metals with the bevel were butted together, and the periphery of the base metals was subjected to restraint-welding onto a commercially available steel plate which had been subjected to beveling performed so as not to interfere with the root bead. Note that, the commercially available steel plate was a steel plate defined in JIS G 3160 (2008) of SM400B steel grade which had a thickness of 30 mm, a width of 150 mm and a length of 200 mm. Further, the restraint-welding was performed using a covered electrode ENi6625 defined in JIS Z 3224 (2010).

Thereafter, multi-pass welding was performed by TIG welding in the bevel. A cut filler obtained from the plate of steel A was used as the filler material to perform the multi-pass welding. The heat input was set in the range of 9 to 15 kJ/cm, and three welded joints were produced for each of the base metals. Further, one of the two welded joints produced from each base metal was left in an as-welded state, and a machined chip was taken from the weld metal and subjected to a chemical analysis. The other of the two welded joints was subjected to an aging heat treatment under conditions of 500 hours at a temperature of 650° C.

Specimens for microstructural investigation were taken from five locations on each of these welded joints. A transverse section of each of the obtained specimens was mirror-polished and then etched before being observed by optical microscopy to determine whether cracks were present in the weld metal. A welded joint for which no cracks were observed in all of the five specimens was determined as "pass", and a welded joint in which cracks were observed was determined as "fail".

<Creep Rupture Strength>

In addition, a round-bar creep rupture test specimen was taken from the remaining one welded joint in a manner so that the weld metal was at the center of the parallel portion, and a creep rupture test was performed under conditions of 650° C. and 216 MPa in which the target rupture time of the base metal was approximately 1,000 hours. A welded joint for which the rupture time was 90% or more of the target rupture time of the base metal was determined as "pass".

A summary of the results of these tests is shown in Tables 5 and 6.

TABLE 5

| Test No. | Base Metal | Filler Material | Chemical Composition (mass %: balance: Fe and impurities) | | | | | | | | |
|---|---|---|---|---|---|---|---|---|---|---|---|
| | | | C | Si | Mn | P | S | Co | Ni | Cr | Nb |
| 17 | K | A | 0.08 | 0.32 | 1.58 | 0.021 | 0.0023 | 0.04 | 10.7 | 17.6 | 0.83 |
| 18 | L | | 0.08 | 0.31 | 1.56 | 0.023 | 0.0022 | 0.03 | 10.5 | 17.4 | 0.84 |
| 19 | M | | 0.07 | 0.31 | 1.57 | 0.021 | 0.0022 | 0.04 | 10.6 | 17.5 | 0.81 |

| Test No. | Base Metal | Filler Material | Chemical Composition (mass %: balance: Fe and impurities) | | | | | Formula (i)† left-hand value |
|---|---|---|---|---|---|---|---|---|
| | | | Ta | N | Al | O | Other | |
| 17 | K | A | 0.005 | 0.10 | 0.011 | 0.006 | — | 0.21 |
| 18 | L | | 0.006 | 0.09 | 0.011 | 0.006 | Cu: 0.04, Mo: 0.03 | 0.20 |
| 19 | M | | 0.005 | 0.09 | 0.011 | 0.006 | Tr: 0.01, REM: 0.004 | 0.23 |

†Nb−7.8 × C ≤ 0.25 ... (i)

TABLE 6

| Test No. | Base Metal | Filler Material | Cracking Resistance during Welding | Cracking Resistance during High Temperature Use | Creep Rupture Strength |
|---|---|---|---|---|---|
| 17 | K | A | Pass | Pass | Pass |
| 18 | L | | Pass | Pass | Pass |
| 19 | M | | Pass | Pass | Pass |

As will be understood from Tables 5 and 6, in Test Nos. 17 to 19 in which the chemical composition of the weld metal satisfied the requirements defined by the present invention, the results showed that sufficient solidification cracking resistance and stress relaxation cracking resistance were exhibited during welding and during aging at a high temperature, and the test specimens were also excellent in creep strength.

As described above, it was found that sufficient solidification cracking resistance and stress relaxation cracking resistance as well as excellent creep strength were obtained only in a case where the requirements of the present invention were satisfied.

INDUSTRIAL APPLICABILITY

According to the present invention, an austenitic stainless steel weld metal which is excellent in weld crack resistance and has high creep strength and which is weld metal that constitutes a structure used in equipment to be used at high temperatures, and also a welded structure that includes the austenitic stainless steel weld metal can be obtained.

The invention claimed is:

1. An austenitic stainless steel weld metal having a chemical composition consisting of, by mass %,
C: 0.05 to 0.11%,
Si: 0.10 to 0.50%,
Mn: 1.0 to 2.5%,
P: 0.035% or less,
S: 0.0030% or less,
Co: 0.01 to 1.00%,
Ni: 9.0 to 11.5%,
Cr: 17.0 to 21.0%,
Nb: 0.60 to 0.90%,
Ta: 0.001 to 0.100%,
N: 0.01 to 0.15%,
Al: 0.030% or less,
O: 0.020% or less,
V: 0 to 0.10%,
Ti: 0 to 0.10%,
W: 0 to 0.50%,
Mo: 0 to 0.50%,
Cu: 0 to 0.50%,
B: 0 to 0.005%,
Ca: 0 to 0.010%,
Mg: 0 to 0.010%,
REM: 0 to 0.10%, and
the balance: Fe and impurities,
and satisfying formula (i) below:

$$Nb - 7.8 \times 0.25 \quad (i)$$

where, each symbol of an element in the above formulas represents a content (mass %) of a corresponding element contained in the steel.

2. The austenitic stainless steel weld metal according to claim 1, wherein the chemical composition contains, by mass %, one or more types of elements selected from:
V: 0.01 to 0.10%,
Ti: 0.01 to 0.10%,
W: 0.01 to 0.50%,
Mo: 0.01 to 0.50%,
Cu: 0.01 to 0.50%,
B: 0.0002 to 0.005%,
Ca: 0.0005 to 0.010%,
Mg: 0.0005 to 0.010%, and
REM: 0.0005 to 0.10%.

3. A welded structure having the austenitic stainless steel weld metal according to claim 1.

4. A welded structure having the austenitic stainless steel weld metal according to claim 2.

* * * * *